US012511494B2

United States Patent
Yang et al.

(10) Patent No.: US 12,511,494 B2
(45) Date of Patent: Dec. 30, 2025

(54) SYSTEMS AND METHODS FOR FINETUNING WITH LEARNED HIDDEN REPRESENTATIONS OF PARAMETER CHANGES

(71) Applicant: Salesforce, Inc., San Francisco, CA (US)

(72) Inventors: Wenzhuo Yang, Singapore (SG); Chu Hong Hoi, Singapore (SG); Kun Zhang, Hong Kong (HK)

(73) Assignee: Salesforce, Inc., San Francisco, CA (US)

( * ) Notice: Subject to any disclaimer, the term of this patent is extended or adjusted under 35 U.S.C. 154(b) by 357 days.

(21) Appl. No.: 18/064,095

(22) Filed: Dec. 9, 2022

(65) Prior Publication Data

US 2024/0020486 A1    Jan. 18, 2024

Related U.S. Application Data

(60) Provisional application No. 63/388,576, filed on Jul. 12, 2022.

(51) Int. Cl.
*G06F 40/40*    (2020.01)
(52) U.S. Cl.
CPC .................... *G06F 40/40* (2020.01)
(58) Field of Classification Search
CPC .......... G06F 40/40; G06F 40/30; G06F 40/20; G06N 3/0455; G06N 3/0495; G06N 3/084
See application file for complete search history.

(56) References Cited

U.S. PATENT DOCUMENTS 11,068,786 B1 *  7/2021  Liu et al. ............... G06N 3/045

OTHER PUBLICATIONS

Jin, X., Zhang, D., Zhu, H., Xiao, W., Li, S.-W., Wei, X., Arnold, A., & Ren, X. (2022). Lifelong Pretraining: Continually Adapting Language Models to Emerging Corpora. (Year: 2022).*
Li, Y., Luo, F., Tan, C., Wang, M., Huang, S., Li, S., & Bai, J. (2022). Parameter-Efficient Sparsity for Large Language Models Fine-Tuning. (Year: 2022).*
Pfeiffer, J., Kamath, A., Rücklé, A., Cho, K., & Gurevych, I. (2021). Adapterfusion: Non-Destructive Task Composition for Transfer Learning. (Year: 2021).*

* cited by examiner

*Primary Examiner* — Paras D Shah
*Assistant Examiner* — Nicholas D Lowen
(74) *Attorney, Agent, or Firm* — Haynes and Boone, LLP

(57) ABSTRACT

Embodiments described herein provide a parameter-efficient finetuning mechanism, referred to as "factor-tuning," which first learns a compact representation of parameter changes with existing datasets on multiple domains, and then finetunes a small number of parameters (automatically extracted from the learned representation) on a new downstream task. In this way, the representation learned in the first step is shared across domains and transferred to new downstream tasks.

20 Claims, 10 Drawing Sheets

| Fine-tuning with 10% training samples | | | | | | |
|---|---|---|---|---|---|---|
| Method | Rotten Tomatoes | IMDB | AG News | SST2 | CoLA | MRPC |
| BitFit | $86.11_{0.73}$ | $91.77_{0.27}$ | $91.65_{0.13}$ | $91.81_{0.37}$ | $38.17_{1.03}$ | $82.88_{0.72}$ |
| Soft-prompt | $85.30_{0.50}$ | $91.01_{0.28}$ | $90.91_{0.29}$ | $91.32_{0.23}$ | $0.00_{0.00}$ | $80.56_{0.07}$ |
| Adapter | $86.09_{0.72}$ | $92.49_{0.05}$ | $92.07_{0.15}$ | $92.45_{0.37}$ | $46.68_{2.73}$ | $85.76_{0.99}$ |
| Prefix-tuning | $86.30_{0.69}$ | $91.43_{0.36}$ | $91.79_{0.08}$ | $91.55_{0.61}$ | $43.65_{5.03}$ | $84.41_{1.04}$ |
| LoRA | $86.02_{0.68}$ | $91.61_{0.45}$ | $91.85_{0.15}$ | $93.20_{0.41}$ | $40.90_{0.52}$ | $85.24_{0.57}$ |
| Factor-Tuning | $88.58_{0.54}$ | $92.85_{0.31}$ | $92.05_{0.03}$ | $94.10_{0.11}$ | $47.23_{2.17}$ | $85.58_{0.21}$ |
| Fine-tuning with 5% training samples | | | | | | |
| Method | Rotten Tomatoes | IMDB | AG News | SST2 | CoLA | MRPC |
| BitFit | $83.67_{0.20}$ | $91.01_{0.09}$ | $90.85_{0.05}$ | $91.85_{0.28}$ | $0.00_{0.00}$ | $80.72_{0.12}$ |
| Soft-prompt | $81.55_{0.23}$ | $90.45_{0.14}$ | $90.28_{0.11}$ | $90.29_{0.05}$ | $0.00_{0.00}$ | $79.87_{0.00}$ |
| Adapter | $85.15_{0.78}$ | $91.43_{0.25}$ | $91.35_{0.12}$ | $92.13_{0.57}$ | $38.28_{1.06}$ | $82.41_{0.35}$ |
| Prefix-tuning | $85.40_{0.36}$ | $90.71_{0.22}$ | $91.23_{0.10}$ | $91.28_{0.26}$ | $34.44_{2.93}$ | $80.89_{0.44}$ |
| LoRA | $85.37_{0.78}$ | $91.42_{0.19}$ | $91.32_{0.14}$ | $92.20_{0.42}$ | $22.22_{1.97}$ | $82.12_{0.38}$ |
| Factor-Tuning | $85.49_{0.48}$ | $91.89_{0.24}$ | $91.28_{0.10}$ | $93.21_{0.26}$ | $35.21_{2.54}$ | $81.07_{0.45}$ |

FIG. 8

| Method | #Params | Percentage |
|---|---|---|
| Adapter | 1.47M | 1.34% |
| Prefix-tuning | 775K | 0.71% |
| LoRA | 886K | 0.81% |
| FT ($\theta$ and 0.5%A) | 1.44M | 1.31% |
| FT ($\theta$ only) | 591K | 0.54% |

FIG. 9

| Fine-tuning with 10% training samples | | | | | | |
|---|---|---|---|---|---|---|
| Method | Rotten Tomatoes | IMDB | AG News | SST2 | CoLA | MRPC |
| Ours | $88.58_{0.54}$ | $92.85_{0.31}$ | $92.05_{0.03}$ | $94.10_{0.11}$ | $47.23_{2.17}$ | $85.58_{0.21}$ |
| Tune $\theta$ only | $88.19_{0.15}$ | $92.54_{0.22}$ | $90.28_{0.16}$ | $92.96_{0.50}$ | $31.73_{1.42}$ | $80.92_{0.24}$ |
| Random $M_i$ | $88.46_{0.17}$ | $92.64_{0.05}$ | $91.82_{0.04}$ | $93.23_{0.40}$ | $41.80_{1.66}$ | $83.66_{0.42}$ |
| Fine-tuning with 5% training samples | | | | | | |
| Method | Rotten Tomatoes | IMDB | AG News | SST2 | CoLA | MRPC |
| Ours | $85.49_{0.48}$ | $91.89_{0.24}$ | $91.28_{0.10}$ | $93.21_{0.26}$ | $35.21_{2.54}$ | $81.07_{0.45}$ |
| Tune $\theta$ only | $85.02_{0.22}$ | $90.99_{0.23}$ | $90.31_{0.10}$ | $92.54_{0.19}$ | $12.88_{2.66}$ | $80.81_{0.17}$ |
| Random $M_i$ | $85.89_{0.30}$ | $91.65_{0.10}$ | $90.89_{0.16}$ | $92.58_{0.15}$ | $26.01_{0.64}$ | $80.82_{0.54}$ |

FIG. 10

SYSTEMS AND METHODS FOR FINETUNING WITH LEARNED HIDDEN REPRESENTATIONS OF PARAMETER CHANGES

CROSS REFERENCES

The application is a nonprovisional application of and claims priority under 35 U.S.C. 119 to commonly-owned U.S. provisional application No. 63/388,576, field Jul. 12, 2022, which is hereby expressly incorporated by reference in its entirety.

TECHNICAL FIELD

The embodiments relate generally to natural language processing (NLP) models and machine learning systems, and more specifically to parameter-efficient fine-tuning with automatically learned hidden representations of parameter changes.

BACKGROUND

Pre-trained NLP models may be fine-tuned for specific downstream tasks, such as summarization, question answering, machine translation, and/or the like. As the size of such pre-trained language models continues to grow, fine-tuning all the model parameters (full fine-tuning) becomes prohibitively expensive or even impossible because a separate replica of the model parameters is required for each downstream task, hindering the model deployment and maintenance, especially when there are a large number of tasks.

Therefore, there is a need for efficient finetuning mechanism of language models.

BRIEF DESCRIPTION OF THE DRAWINGS

FIGS. 8-11 provide example data experiments performance results of the factor-tuning framework described in FIGS. 1-7, according to embodiments described herein.

Figure 1:
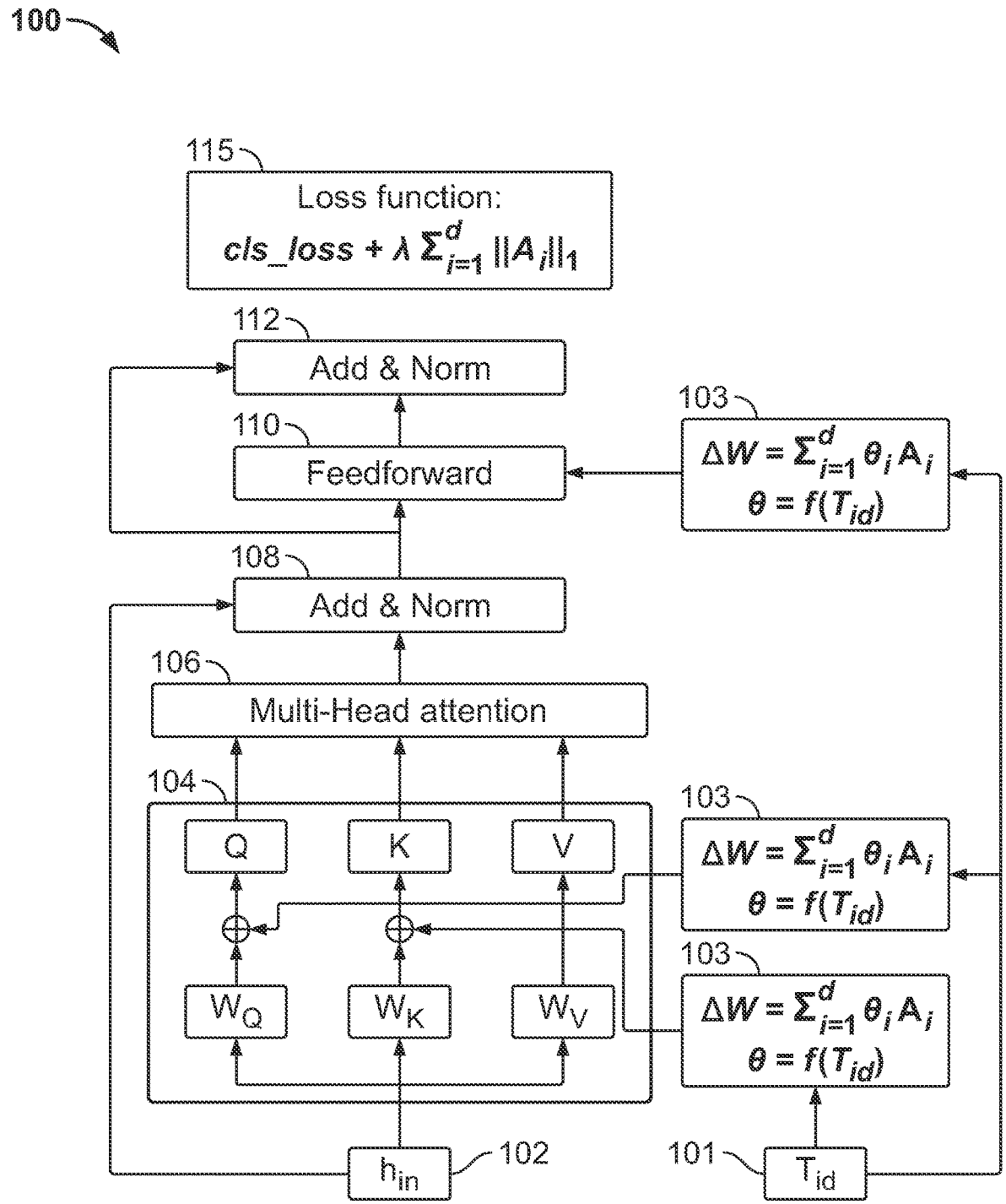
FIG. 1 is a simplified block diagram illustrating an example network architecture for learning domain-dependent hidden factors and compact representations of parameter changes in a pre-trained NLP model on a collection of datasets from multiple domains, according to embodiments described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Pre-trained NLP models may be fine-tuned for specific downstream tasks, such as summarization, question answering, machine translation, and/or the like. Due to the growing size of large pre-trained language models, parameter-efficient tuning methods may be adopted by updating very few trainable parameters. For example, only a small number of extra parameters are updated during finetuning while keeping the backbone NLP model fixed. However, the additional trainable parameters in existing parameter-efficient methods are only manually designed and empirically evaluated. In practice, it remains difficult to select the most suitable parameter-efficient tuning method for a new task because these methods have different characteristics and perform differently on downstream tasks.

Embodiments described herein provide a parameter-efficient finetuning mechanism, referred to as "Factor-Tuning," which first learns a compact representation of parameter changes with existing datasets on multiple domains, and then fine-tunes a small number of parameters (automatically extracted from the learned representation) on a new downstream task. In this way, the representation learned in the first step is shared across domains and transferred to new downstream tasks.

Specifically, as NLP models are often trained with samples drawn from a certain data distribution, the optimal model parameters are controlled by these hidden factors such as the data distribution as well. Given the datasets from multiple domains that an NLP model is trained on, a compact representation of changes in the parameters of the optimal model across domains may be derived. This representation manifests which model parameters may change and how they change on a low-dimensional manifold (governed by the hidden factors) so that it automatically determines which parameters should be updated and how to update them efficiently during fine-tuning.

For example, given a pre-trained language model M, let W be one of the parameters to be tuned for a downstream task. For example, W can be one of the weight matrices of the linear layers in M, e.g., key, query and value layers in each multi-head attention module in the pre-trained BERT model. For a compact representation of the parameter changes of M, only a small part of W will be updated during fine-tuning on the target task. Therefore, the domain-dependent hidden factors and compact representations of parameter changes of M on a collection of datasets from multiple domains may be learnt. M may then be fine-tuned on a new downstream task, e.g., by updating the learned hidden factors and a small number of additional parameters (learned from the previous step) on a specific downstream task (which can be from an existing domain or new domain).

Specifically, as data distribution varies across domains because some underlying parameters or hidden factors $\theta \in \mathbb{R}^d$ that may take different values across domains, meaning that the data distribution is a function of $\theta$, i.e., $P^{(i)}(x) = f(\theta^{(i)})$ in the ith domain. Some of the factors may not be identifiable from the observed data, but the identifiable representations of the factors or factor combinations may be considered (e.g., for factor $\theta_j$, if only $\theta_j^2$ is involved in $f$, then $\theta_j$ is not identifiable, but $\theta_j^2$ may be identifiable. In light of the modularity property of a causal system, each of those factors may influence only a very small number of features.

In one embodiment, as optimal machine learning models trained with data are determined by the data distributions, e.g., a classification model is determined by the conditional distribution of the label given other features, the optimal models are also functions of the factors $\theta$ that take different values across domains. Therefore, the changes in the optimal model across domains can be explained by those changing factors. Since the optimal parameters in the machine learning model are determined by the data distribution, these optimal parameters in the model are also functions of the factors $\theta$. Therefore, the model parameters may be parametrized as functions of $\theta$, i.e., $$W = h(\theta_1, \ldots, \theta_d) \qquad (1)$$

Because of the modularity property of a causal system, a large number of the model parameters will be fixed across domains during fine-tuning, meaning that the influence of those factors is sparse. Thus, the goal is to learn which parts of the model parameters change and how they change across domains. Assuming a linear case that the parameters for a certain domain are represented as:

$$W = W_0 + \theta_1 A_1 + \theta_2 A_2 + \ldots + \theta_d A_d, \qquad (2)$$

where $W_0$ represents the values which are fixed across domains, and $A_1, \ldots, A_d$ are sparse components shared across domains and linearly combined by the factors $\theta$. Therefore, the Factor-Tuning framework learns the factors $\theta$ and sparse components $A_1, \ldots, A_d$, and then fine-tune on the downstream tasks. During fine-tuning, the trainable parameters include $\theta$ and a small number of parameters in $A_1, \ldots, A_d$. To determine which parameters in $A_1, \ldots, A_d$ to be updated, the sparsity pattern of each $A_1, \ldots, A_d$ is considered. For example, the parameters in $A_1, \ldots, A_d$ with larger values may have a bigger impact during fine-tuning on new tasks, so only these parameters may be tuned while others are fixed.

In this way, given a large-scale language model, the Factor-Tuning framework automatically learns which parts of model parameters to change and how to update them efficiently during fine-tuning for a target downstream task.

Factor-Tuning Overview

FIG. 1 is a simplified block diagram illustrating an example network architecture 100 for learning domain-dependent hidden factors and compact representations of parameter changes in a pre-trained NLP model on a collection of datasets from multiple domains, according to embodiments described herein. The network architecture 100 may be built on a pre-trained language model which comprises the query, key and value layer 104, a multi-head attention layer 106, an add and normalization layer 108, a feedforward layer 110 and another add and normalization layer 112. The "factor" modules 103 are added into the query layer and key layer 104, and also the feedforward layer 110 after the multi-head attention layer 106.

In one embodiment, a number of n training datasets corresponding to n available domains may be used in the training. Each domain has a different factor $\theta = \{\theta_1, \ldots, \theta_d\}$, denoted by $\theta^1, \ldots, \theta^n$, and the sparse components $A_1, \ldots, A_d$ are shared across domains. For example, given each input sequence from the training data X of the n domains the layer input 102 from the previous layer of the pretrained language model, denoted by $h_{in}$, may be input to the query and key layer 104.

In this way, given the training data X of the n domains, the parameters W may be trained by minimizing a loss function comprising the classification loss and a regularization term:

$$L(X) = cls_{loss}(X, W) + \lambda \Sigma \Sigma_{i=1}^d \|A_i\|_1, \qquad (3)$$

For example, the classification loss $cls_{loss}(X, W)$ is computed by: for each input sequence from the training data X, generating by an encoder, embeddings 102 of the last hidden layer in the encoder, and passing the embeddings 102 to the query and key layer 104, the multi-head attention layer 106, the addition and normalization layer 108, the feed forward layer 110, and another add and normalization layer 112 to generate a decoding output, according to the model parameters W. A cross entropy is then computed as the classification loss by comparing the decoding output and a ground-truth label corresponding to the respective input sequence. The L1 regularization term $\lambda \Sigma \Sigma_{i=1}^d \|A_i\|_1$ is applied to encourage sparsity in $A_1, \ldots, A_d$. The loss function may then be used to update the parameters W. In other words, the factor $\theta = \{\theta_1, \ldots, \theta_d\}$ and the sparse components $A_1, \ldots, A_d$ may be updated based on the loss function via backpropagation.

In one embodiment, any weights in the pre-trained model may be modified. But changing all the model parameters in this step is not necessary because empirically, changing the attention modules including the query and key layer 104 and the multi-head attention layer 106, and/or the feedforward layer 110 after each attention module can often be sufficient to achieve good performance on downstream tasks in different domains. Therefore, the "factor" modules 103, indicating the parameters to be updated, e.g., $\Delta W = \Sigma_{i=1}^d \theta_i A_i$, ay be added into the feedforward layer 110 after each multi-head attention layer 106 and into the query and key layers 104 in each multi-head attention module.

Specifically, the factor $\theta$ can be expressed as a function of the task ID 101, e.g., $\theta = f(T_{id})$. The task ID i is first mapped to a d-dimensional vector e(i) followed by tanh, i.e., $\theta^i = \tanh(e(i))$. Vector e(i) is trainable. The tanh operation is chosen to compute $\theta$ such that $\theta$ should be bounded to make the sparse regularization term on Ai effective. If $\theta$ is allowed to be unbounded, the values of Ai can be arbitrarily small so that the regularization term $\|Ai\|$ will be close to zero, making it hard to obtain sparse solutions.

Therefore, as the parameters W are updated using the loss function defined in Eq. (3), the $\Delta W = \Sigma_{i=1}^d \theta_i A_i$ are in fact updated. Across the n domains, the factors $\theta$ for each domain and sparse components $A_1, \ldots, A_d$ that are shared across domains can thus be obtained from the different $\Delta W$ across the n domains.

Figure 2:
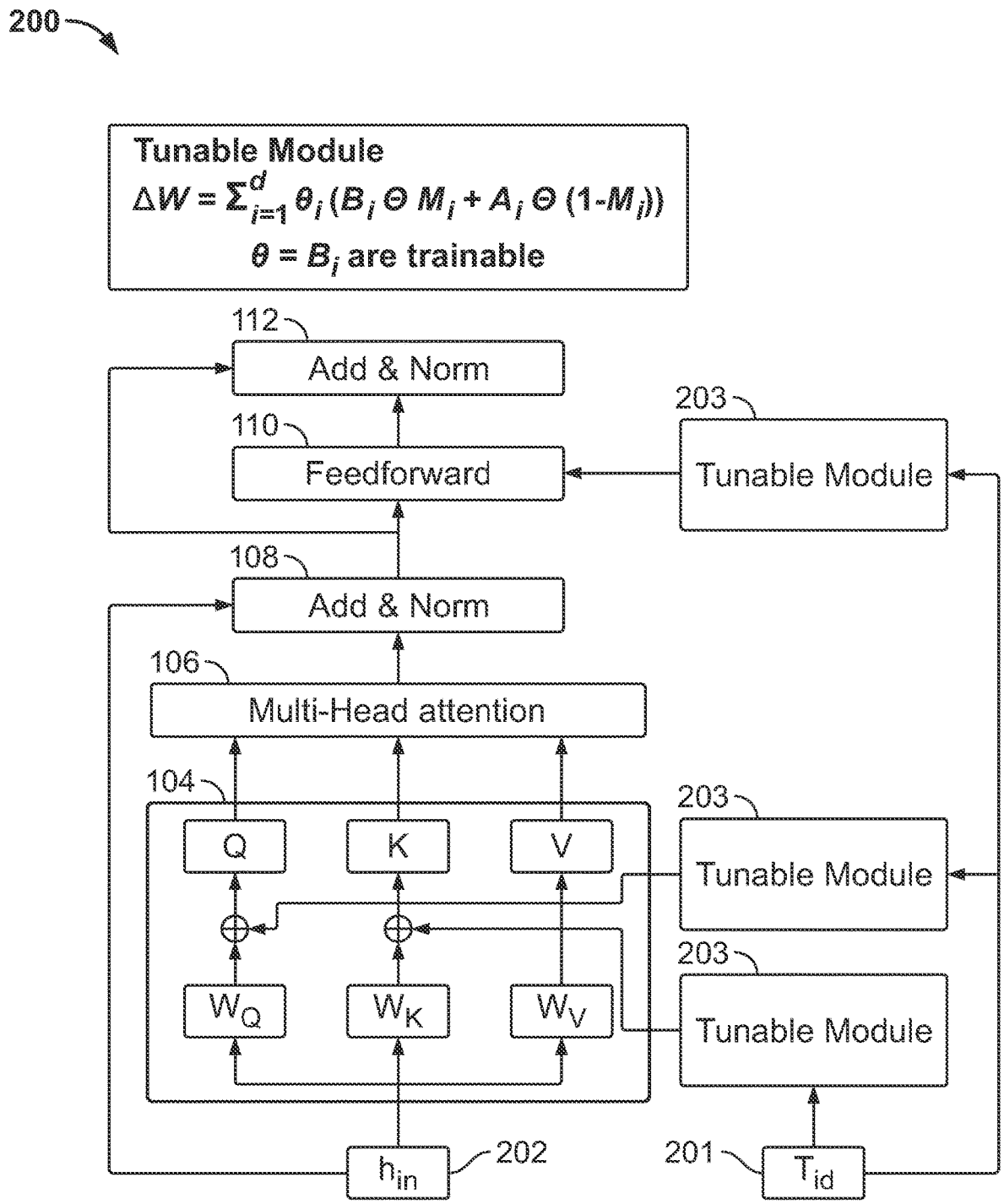
FIG. 2 is a simplified block diagram illustrating an example network architecture for fine-tuning a pre-trained NLP model on a new task, according to embodiments described herein.

FIG. 2 is a simplified block diagram illustrating an example network architecture for fine-tuning a pre-trained NLP model on a new task, according to embodiments described herein. After $\theta$ and $A_1, \ldots, A_d$ are learned from the network architecture in FIG. 1, the NLP model M is fine-tuned on downstream tasks. During fine-tuning, the trainable parameters include θ and a small number of parameters $B_1, \ldots, B_d$ in $A_1, \ldots, A_d$, respectively, are updated. To determine which parameters in $A_1, \ldots, A_d$ are to be updated, the sparsity pattern of each $A_1, \ldots, A_d$ is determined. For example, the parameters in $A_i$ with larger values have a bigger impact during fine-tuning on new tasks, so only these parameters are to be tuned while others are being fixed.

Specifically, the sparsity pattern or mask of $A_i$, denoted y M_i, may be defined as: $M_i=1[|A_i|>T]$ given a certain threshold T, where 1[ ] is the indicator function. During fine tuning, only the values with positive sparsity masks are updated. Therefore, the new model parameters in fine-tuning can be represented by:

$$W = W_0 + \sum_{i=1}^{d} \theta_i(B_i \odot M_i + A_i \odot (1 - M_i)).$$

where ⊙ is the element-wise product, $W_0$ represents the weights in the pre-trained language model, components $A_1, \ldots, A_d$ and masks $M_1, \ldots, M_d$ are fixed, while θ, $B_1, \ldots, B_d$ are trainable parameters. This formulation indicates that only the factors θ (the linear combination weights) and a small number of parameters in $A_1, \ldots, A_d$ (determined by $M_1, \ldots, M_d$) are fine-tuned on the downstream task.

Therefore, for a given training input from a target domain (that is different from the n domains used in relation to FIG. 1) and/or corresponding to a target task, the embedding $h_{in}$ 202 from the encoder of the pretrained language model may be passed to the query and key layer 104 in a similar manner as described in FIG. 1. However, tunable modules 203 may be added to indicating the parameters to be updated, e.g., $\Delta W = \sum_{i=1}^{d} \theta_i(B_i \odot M_i + A_i \odot (1-M_i))$, may be added into the feedforward layer 110 after each multi-head attention layer 106 and into the query and key layers 104 in each multi-head attention module. In this way, ΔW may be updated with a loss function computed based on the decoding output from the addition and normalization layer 112 in response to the training input on the target domain and/or for a target task. As the components $A_1, \ldots, A_d$ have been pre-learnt as discussed in relation to FIG. 1, and masks $M_1, \ldots, M_d$ are fixed, parameters θ, $B_1, \ldots, B_d$ are actually updated during the fine-tuning.

In the fine-tuning described in relation to FIG. 2, the threshold T that defines the masks $M_1, \ldots, M_d$ controls how many parameters to be updated during fine-tuning, e.g., tuning only θ when T is greater than the maximum value in $A_1, \ldots, A_d$, while full fine-tuning on θ and many of $A_1, \ldots, A_d$ when T=0. In practice, T may be computed by specifying the quantile of all the values in $|A_1|, \ldots, |A_d|$, e.g., 99-quantile means 1% parameters in $|A_i|, \ldots, |A_d|$ are trainable. Therefore, compared to existing approaches that mostly train extra parameters designed manually, the training framework learns how to update the weights W via the shared sparse components and the domain dependent factors.

Computer and Networked Environments

Figure 3:
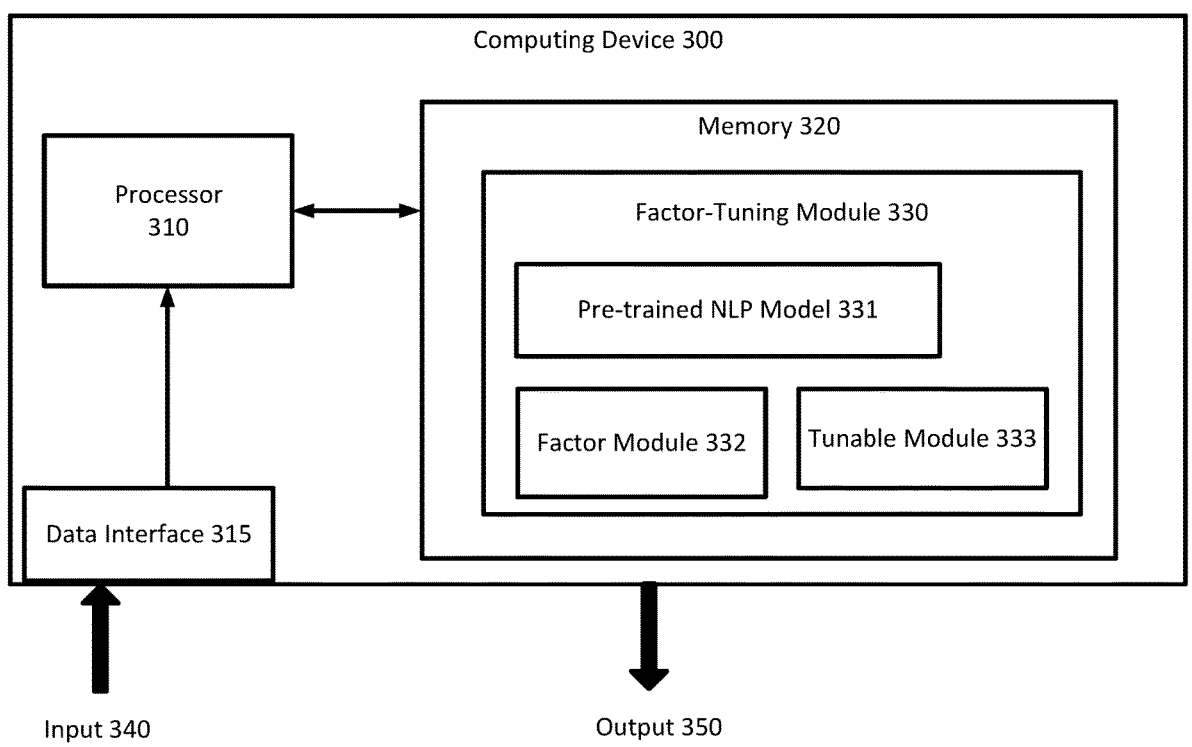
FIG. 3 is a simplified block diagram illustrating the framework of a parameter-efficient fine-tuning model, according to one embodiment described herein.

FIG. 3 is a simplified block diagram illustrating the framework of a parameter-efficient fine-tuning model, according to one embodiment described herein. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for factor-tuning module 330 that may be used to implement and/or emulate the systems and models, and/or to implement any of the methods described further herein. A factor-tuning module 330 may receive input 340 such as an NLP input via the data interface 315 and generate an output 350 which may be an NLP output, such as an answer to the question, and/or the like. Examples of the input data may include a textual question, a sentence and/or the like. Examples of the output data may include a text classification, an answer, and/or the like.

The data interface 315 may comprise a communication interface, a user interface (such as a voice input interface, a graphical user interface, and/or the like). For example, the computing device 300 may receive the input 340 (such as a training dataset) from a networked database via a communication interface. Or the computing device 300 may receive the input 340, such as an articulated question, from a user via the user interface.

In some embodiments, the factor-tuning module 330 is configured to finetune a language model on various downstream tasks. The factor-tuning module 330 may further include a pretrained NLP submodule 331 (e.g., such as a pre-trained BERT model), factor submodule 332 (e.g., similar to 103 in FIG. 1) and a tunable submodule 333 (e.g., similar to 203 in FIG. 2).

In one embodiment, the factor-tuning module 330 and its submodules 331-333 may be implemented by hardware, software and/or a combination thereof.

Some examples of computing devices, such as computing device 300 may include non-transitory, tangible, machine readable media that include executable code that when run by one or more processors (e.g., processor 310) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 4:
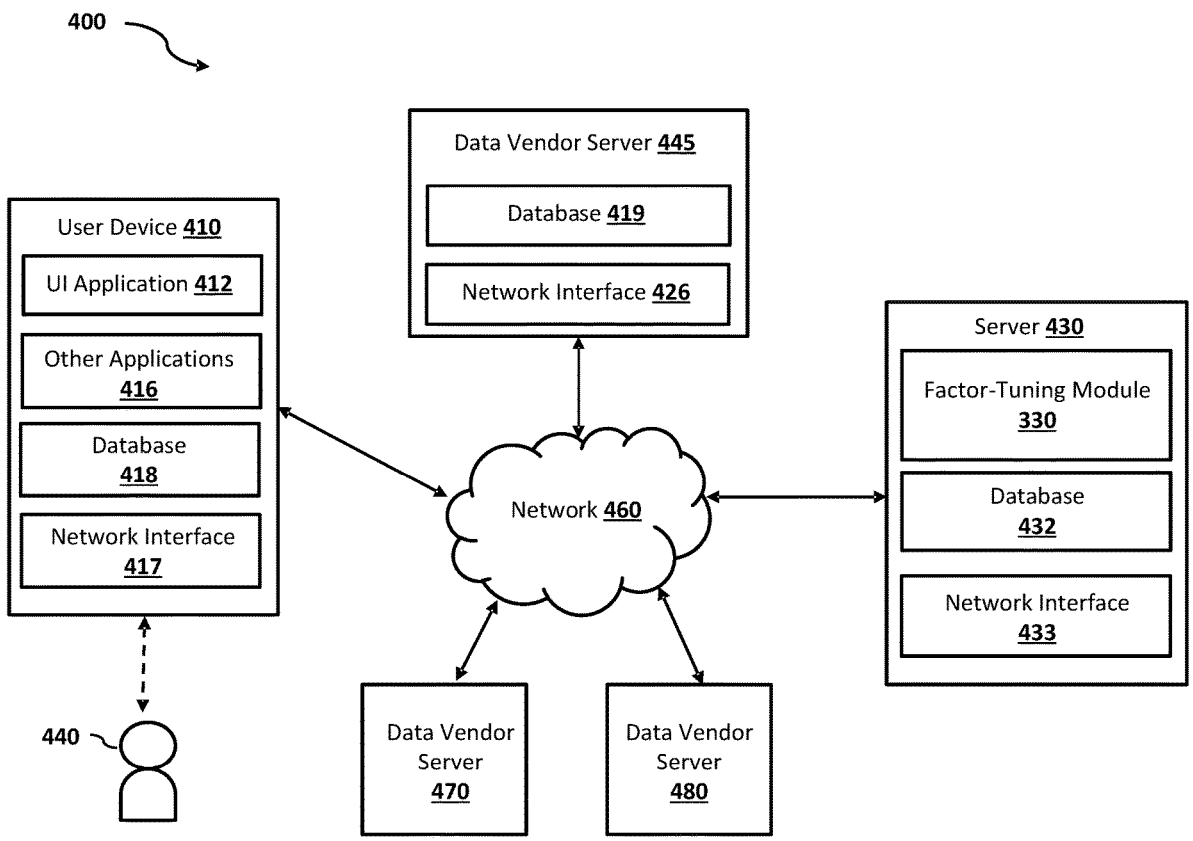
FIG. 4 is a simplified block diagram illustrating the framework of a parameter-efficient fine-tuning model, according to one embodiment described herein.

FIG. 4 is a simplified diagram illustrating a networked environment implementing the factor-tuning model described in FIGS. 1-2, according to one embodiment described herein. In one embodiment, block diagram 400 shows a system including the user device 410 which may be operated by user 440, data vendor servers 445, 470 and 480, server 430, and other forms of devices, servers, and/or software components that operate to perform various methodologies in accordance with the described embodiments. Exemplary devices and servers may include device, stand-alone, and enterprise-class servers which may be similar to the computing device 300 described in FIG. 3, operating an OS such as a MICROSOFT® OS, a UNIX® OS, a LINUX® OS, or other suitable device and/or server-based OS. It can be appreciated that the devices and/or servers illustrated in FIG. 4 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 410, data vendor servers 445, 470 and 480, and the server 430 may communicate with each other over a network 460. User device 410 may be utilized by a user 440 (e.g., a driver, a system admin, etc.) to access the various features available for user device 410, which may include processes and/or applications associated with the server 430 to receive an output data anomaly report.

User device 410, data vendor server 445, and the server 430 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 400, and/or accessible over network 460.

User device 410 may be implemented as a communication device that may utilize appropriate hardware and software configured for wired and/or wireless communication with data vendor server 445 and/or the server 430. For example, in one embodiment, user device 410 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 410 of FIG. 4 contains a user interface (UI) application 412, and/or other applications 416, which may correspond to executable processes, procedures, and/or applications with associated hardware. For example, the user device 410 may receive a message indicating an answer to a question from the server 430 and display the message via the UI application 412. In other embodiments, user device 410 may include additional or different modules having specialized hardware and/or software as required.

In various embodiments, user device 410 includes other applications 416 as may be desired in particular embodiments to provide features to user device 410. For example, other applications 416 may include security applications for implementing client-side security features, programmatic client applications for interfacing with appropriate application programming interfaces (APIs) over network 460, or other types of applications. Other applications 416 may also include communication applications, such as email, texting, voice, social networking, and IM applications that allow a user to send and receive emails, calls, texts, and other notifications through network 460. For example, the other application 416 may be an email or instant messaging application that receives a result message from the server 430. Other applications 416 may include device interfaces and other display modules that may receive input and/or output information. For example, other applications 416 may contain software programs for asset management, executable by a processor, including a graphical user interface (GUI) configured to provide an interface to the user 440 to view the answer.

User device 410 may further include database 418 stored in a transitory and/or non-transitory memory of user device 410, which may store various applications and data and be utilized during execution of various modules of user device 410. Database 418 may store user profile relating to the user 440, predictions previously viewed or saved by the user 440, historical data received from the server 430, and/or the like. In some embodiments, database 418 may be local to user device 410. However, in other embodiments, database 418 may be external to user device 410 and accessible by user device 410, including cloud storage systems and/or databases that are accessible over network 460.

User device 410 includes at least one network interface component 419 adapted to communicate with data vendor server 445 and/or the server 430. In various embodiments, network interface component 417 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 445 may correspond to a server that hosts one or more of the databases 419 to provide training datasets including training images and questions to the server 430. The database 419 may be implemented by one or more relational database, distributed databases, cloud databases, and/or the like.

The data vendor server 445 includes at least one network interface component 426 adapted to communicate with user device 410 and/or the server 430. In various embodiments, network interface component 426 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 445 may send asset information from the database 403, via the network interface 426, to the server 430.

The server 430 may be housed with the factor-tuning module 330 and its submodules described in FIG. 3. In some implementations, module 330 may receive data from database 419 at the data vendor server 445 via the network 460 to generate an answer to a visual question. The generated answer may also be sent to the user device 410 for review by the user 440 via the network 460.

The database 432 may be stored in a transitory and/or non-transitory memory of the server 430. In one implementation, the database 432 may store data obtained from the data vendor server 445. In one implementation, the database 432 may store parameters of the multilingual model 330. In one implementation, the database 432 may store previously generated answers, and the corresponding input feature vectors.

In some embodiments, database 432 may be local to the server 430. However, in other embodiments, database 432 may be external to the server 430 and accessible by the server 430, including cloud storage systems and/or databases that are accessible over network 460.

The server 430 includes at least one network interface component 433 adapted to communicate with user device 410 and/or data vendor servers 445, 470 or 480 over network 460. In various embodiments, network interface component 433 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 460 may be implemented as a single network or a combination of multiple networks. For example, in various embodiments, network 460 may include the Internet or one or more intranets, landline networks, wireless networks, and/or other appropriate types of networks. Thus, network 460 may correspond to small scale communication networks, such as a private or local area network, or a larger scale network, such as a wide area network or the Internet, accessible by the various components of system 400.

Example Work Flows

Figure 5:
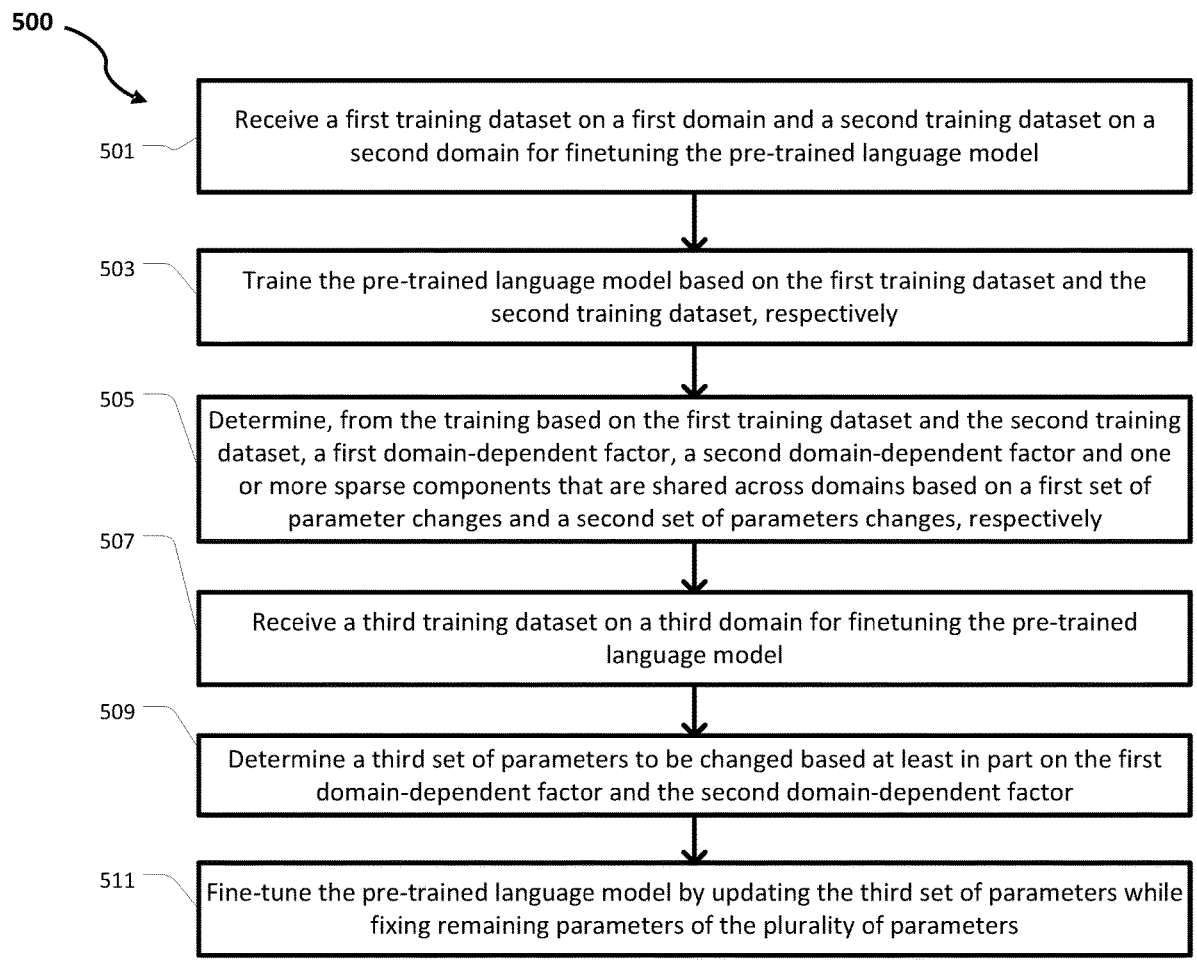
FIG. 5 provides an example logic flow diagram illustrating an example method of parameter-efficient training of a pre-trained language model based on network architectures shown in FIGS. 1-2, according to embodiments described herein.

FIG. 5 provides an example logic flow diagram illustrating an example method 500 of parameter-efficient training of a pre-trained language model based on network architectures shown in FIGS. 1-2, according to embodiments described herein. One or more of the processes of method 500 may be implemented, at least in part, in the form of executable code stored on non-transitory, tangible, machine-readable media that when run by one or more processors may cause the one or more processors to perform one or more of the processes. In some embodiments, method 500 corresponds to an example operation of the Factor-Tuning module 330 (e.g., FIGS. 3-4).

As illustrated, the method 500 includes a number of enumerated steps, but aspects of the methods may include additional steps before, after, and in between the enumerated steps. In some aspects, one or more of the enumerated steps may be omitted or performed in a different order.

At step 501, training data on multiple domains, e.g., a first training dataset on a first domain and a second training dataset on a second domain, may be received (e.g., via data interface 315 in FIG. 3, or network interface 433 in FIG. 4) for finetuning the pre-trained language model (e.g., a BERT model), e.g., second-stage pretraining. The pre-trained language model may be stored at memory 320 in FIG. 3.

At step 503, the pre-trained language model may then be trained based on the first training dataset and the second training dataset, respectively. Training details may be discussed in relation to FIG. 6.

At step 505, domain-dependent hidden factors and sparse components that are shared across domains may be determined. Specifically, from the training based on the first training dataset and the second training dataset, a first domain-dependent factor based on a first set of parameter changes and a second domain-dependent factor are determined based on a second set of parameters changes, respectively, as further discussed in relation to FIG. 6.

At step 507, a third training dataset on a third domain (e.g., a new training dataset for finetuning on a new downstream task) may be received for finetuning the pre-trained language model. For example, the third training dataset may correspond to a different task, or on a different domain from the first and the second training datasets.

Figure 7:
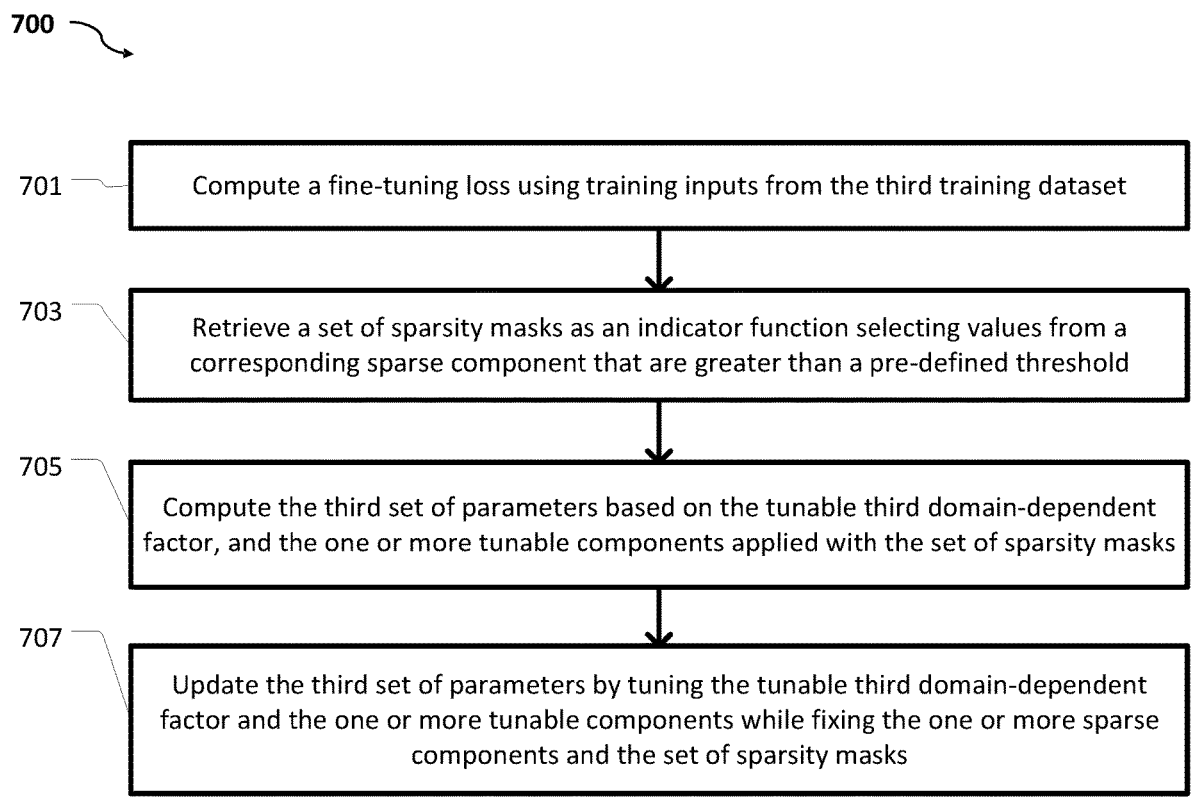
FIG. 7 provides an example logic flow diagram illustrating an embodiment of finetuning only a subset of parameters of the pretrained language model when fine-tuning on a new domain corresponding to steps in FIG. 5, according to embodiments described herein.

At step 509, a third set of parameters to be changed may be determined based at least in part on the first domain-dependent factor and the second domain-dependent factor, as further discussed in relation to FIG. 7.

At step 511, the pre-trained language model may be fine-tuned by updating the third set of parameters while fixing remaining parameters of the plurality of parameters. For example, as shown in FIGS. 1-2, only some parameters in the query and key layer 104 and the feed forward layer 110 are updated.

Figure 6:
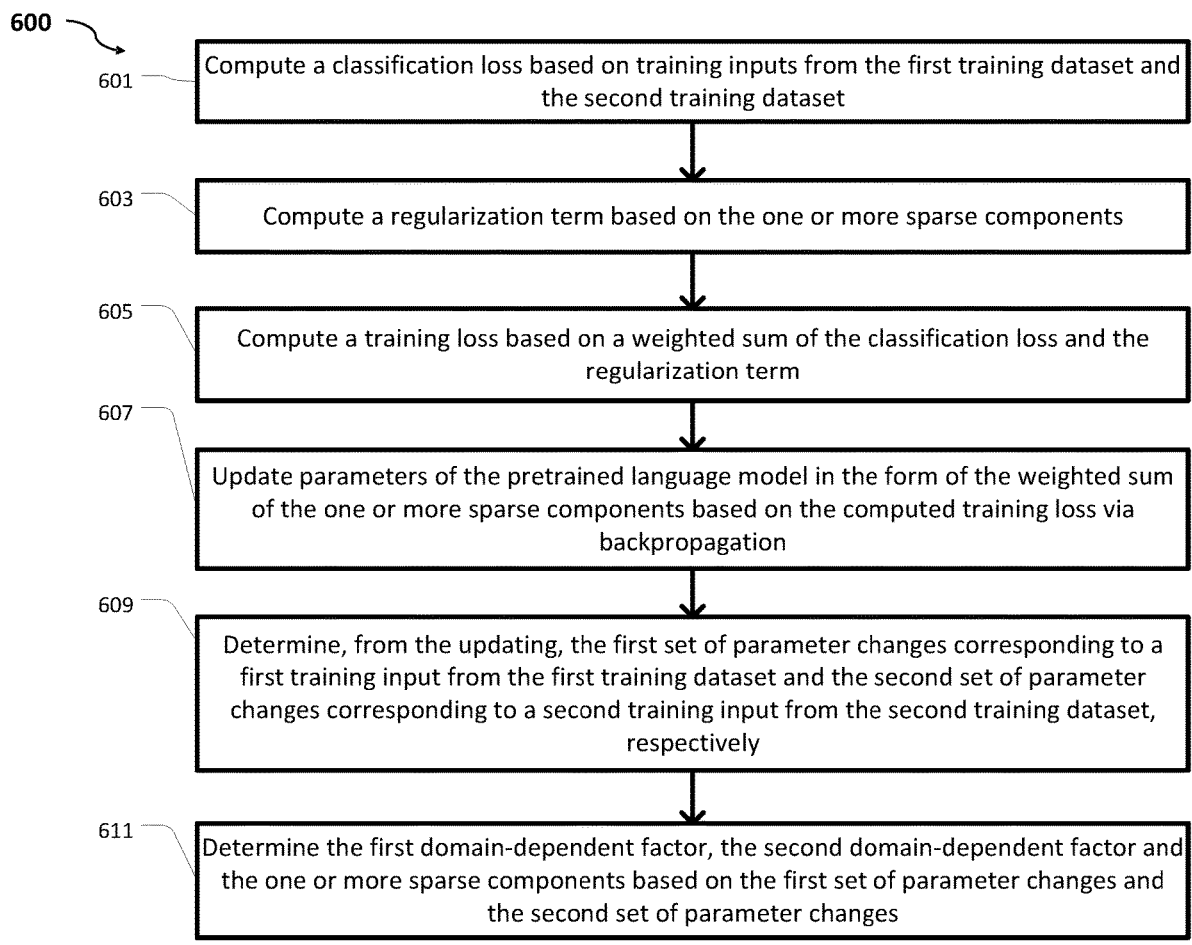
FIG. 6 provides an example logic flow diagram illustrating an embodiment of determining domain-dependent factors and cross-domain sparse components during training as shown in one step in FIG. 5, according to embodiments described herein.

FIG. 6 provides an example logic flow diagram illustrating an embodiment of determining domain-dependent factors and cross-domain sparse components during training corresponding to step 505 in FIG. 5, according to embodiments described herein. One or more of the processes of method 600 may be implemented, at least in part, in the form of executable code stored on non-transitory, tangible, machine-readable media that when run by one or more processors may cause the one or more processors to perform one or more of the processes. In some embodiments, method 600 corresponds to an example operation of the Factor-Tuning module 330 (e.g., FIGS. 3-4).

As illustrated, the method 600 includes a number of enumerated steps, but aspects of the methods may include additional steps before, after, and in between the enumerated steps. In some aspects, one or more of the enumerated steps may be omitted or performed in a different order.

At step 601, as part of step 503 in FIG. 5, a classification loss (e.g., $\text{cls}_{loss}(X, W)$) may be computed based on training inputs from the first training dataset and the second training dataset. For example, training inputs from the first training dataset and the second training data set may be used to generate a classification output from the pretrained language model. And the classification output are used to compute the classification loss.

At step 603, a regularization term may be computed based on the one or more sparse components, e.g., $\Sigma_{i=1}^{d} \|A_i\|_1$. For example, an initial value of the one or more sparse components that are shared across the first domain and the second domain may be determined, from the training based on the first training dataset and the second training dataset. In this way, parameters of the pre-trained language model are updated as a weighted sum of the one or more sparse components weighted by the first domain-dependent factor or the second domain-dependent factor.

At step 605, a training loss may be computed based on a weighted sum of the classification loss and the regularization term.

At step 607, parameters of the pretrained language model may be updated in the form of the weighted sum of the one or more sparse components based on the computed training loss via backpropagation. For example, updating the weighted sum of the one or more sparse components is performed by a first factor module 103 inserted at a query and key layer 104 and a second factor module 103 inserted at a feedforward layer 110 in the pretrained language model. In this way, the first factor module or the second factor module 103 updates a subset of the parameters (e.g., $\Delta W = \Sigma_{i=1}^{d} \theta_i A_i$ may update only parameters in layers 104 and 110) that correspond to the weighted sum of the one or more sparse components.

At step 609, from the updating, parameters corresponding to the training input from multiple domains (e.g., the first set of parameter changes corresponding to a first training input from the first training dataset) may be determined. Similarly, the second set of parameter changes corresponding to a second training input from the second training dataset may be determined, e.g., $\Delta W = \Sigma_{i=1}^{d} \theta_i A_i$.

At step 611, the first domain-dependent factor, the second domain-dependent factor and the one or more sparse components may then be determined and/or updated based on the first set of parameter changes and the second set of parameter changes.

FIG. 7 provides an example logic flow diagram illustrating an embodiment of finetuning only a subset of parameters of the pretrained language model when fine-tuning on a new domain corresponding to steps 509-511 in FIG. 5, according to embodiments described herein. One or more of the processes of method 700 may be implemented, at least in part, in the form of executable code stored on non-transitory, tangible, machine-readable media that when run by one or more processors may cause the one or more processors to perform one or more of the processes. In some embodiments, method 700 corresponds to an example operation of the Factor-Tuning module 330 (e.g., FIGS. 3-4).

As illustrated, the method 700 includes a number of enumerated steps, but aspects of the methods may include additional steps before, after, and in between the enumerated steps. In some aspects, one or more of the enumerated steps may be omitted or performed in a different order.

At step 701, a fine-tuning loss may be computed using training inputs from the third training dataset (e.g., the training dataset on the new downstream task).

At step 703, a set of sparsity masks may be retrieved as an indicator function selecting values from a corresponding sparse component that are greater than a pre-defined threshold. For example, the set of sparsity masks may be adjusted according to a specified adjustment (e.g., set by a programmer, etc.) to the pre-defined threshold, and in this way a total number of parameters in the third set of parameters may be controlled by applying an adjusted threshold.

At step 705, the third set of parameters may be computed based on the tunable third domain-dependent factor, and the one or more tunable components applied with the set of sparsity masks, e.g., $\Delta W = \Sigma_{i=1}^{d} \theta_i (B_i \odot M_i + A_i \odot (1-M_i))$.

At step 707, the third set of parameters may be updated for the pretrained language model based on the fine-tuning loss, while the one or more sparse components and the set of sparsity masks are fixed. Specifically, the third set of parameters are updated by tuning a tunable third domain-dependent factor and one or more tunable components. Each tunable component includes a subset of tunable parameters from a corresponding sparse component from the determined one or more sparse components. In one implementation, the fine-tuning is performed by a first tunable module 203 inserted at a query and key layer 104 and a second tunable module 203 inserted at a feedforward layer 110 in the pretrained language model. The first tunable module or the second tunable module 203 updates the third set of parameters by tuning the tunable third domain-dependent factor and the one or more tunable components.

Example Data Experiments Performance

Example data experiments are carried to evaluates the performance of the Factor-tuning approach. Here text classification tasks is considered in the evaluation because many public text classification datasets on multiple domains are available for learning a compact representation of parameter changes.

The following public datasets were used in experiments: 1) Sentiment analysis including Rotten Tomatoes (Pang and Lee, Seeing stars: Exploiting class relationships for sentiment categorization with respect to rating scales, in Proceedings of the Annual Meeting of the Association for Computational Linguistics, 2005), IMDB (Maas et al., Learning word vectors for sentiment analysis, in Proceedings of the 49th Annual Meeting of the Association for Computational Linguistics: Human Language Technologies, pages 142-150, 2011), SST2 (Wang et al., GLUE: A multi-task benchmark and analysis platform for natural language understanding, in Proceedings of the EMNLP Workshop BlackboxNLP: Analyzing and Interpreting Neural Networks for NLP, pages 353-355, 2018); 2) New articles classification including Reuters-21578, AG News; 3) CoLA for linguistic acceptability (Wang et al., 2018); 4) DBPedia for Wikipedia article classification (Lehmann et al., DBpedia—a large-scale, multilingual knowledge base extracted from Wikipedia, Semantic Web Journal, 6(2):167-195, 2015); 5) GoEmotions for emotion classification (Demszky et al., Goemotions: A dataset of fine-grained emotions, arXiv:2005.00547, 2020); 6) SMS Spam Collection for spam classification3 and 7) MRPC dataset.

In one embodiment, a subset of these datasets is used for learning the representation of parameter changes and the remaining ones are used for fine-tuning. Specifically, the experiments choose 1) SST2, Reuters, CoLA, DBPedia, GoEmotions for learning the representations, while Rotten Tomatoes, IMDB, AG News, MRPC for fine-tuning, and 2) Rotten Tomatoes, IMDB, AG News, DBPedia, GoEmotions for learning the representations, while SST2, CoLA for fine-tuning. For fine-tuning, a low-resource setting where the training data is limited, e.g., 5% or 10% sampled examples from the training dataset for each task. The validation sets are used to find the best model. If a public dataset does not provide a validation dataset (the validation dataset is taken as the test dataset if it has no test dataset), it is randomly drawn from the training dataset with the same sample size as the test dataset (it is guaranteed that there are no overlaps between training and validation sets). Each experiment may be repeated 5 times with different random seeds and report the mean and variance of the performance metrics.

In one embodiment, the Fine-Tuning approach may be compared with the popular and relevant parameter-efficient fine-tuning methods, including BitFit (Zaken et al., BitFit: Simple parameter-efficient fine-tuning for transformer-based masked language-models, arXiv:2106.10199, 2021), Soft-prompt (Lester et al., The power of scale for parameter-efficient prompt tuning, arXiv:2104.08691, 2021), Adapter (Pfeiffer et al., AdapterFusion: Non-destructive task composition for transfer learning, in Proceedings of the 16th Conference of the European Chapter of the Association for Computational Linguistics: Main Volume, pages 487-503, Online, 2021), Prefix-tuning (Li et al., Prefix-tuning: Optimizing continuous prompts for generation, in Proceedings of the 59th Annual Meeting of the Association for Computational Linguistics and the 11th International Joint Conference on Natural Language Processing (Volume 1: Long Papers), pages 4582-4597, 2021) and LoRA (Hu et al., Lora: Low-rank adaptation of large language models, arXiv: 2106.09685, 2021). RoBERTabase (Liu et al., Roberta: A robustly optimized BERT pretraining approach, arXiv: 1907.11692, 2019) may be taken as the backbone pretrained language model in our experiments. For these approaches, default hyperparameters, e.g., adapter hidden size is 48, prefix length and prompt length are 50, and LoRA rank is 8. The maximum number of training samples for each task is set as 30k (for data balance) and regularization weight $\lambda=0.0001$ when optimizing Eq. (3). The number of components d, number of training epochs and optimizer are 4, 10 and AdamW, respectively. The learning rate is 4e-4, the batch size is 32 and the weight decay is 0.1.

For Factor-Tuning, there are no overlaps between the datasets for learning the representations of parameter changes and the datasets for fine-tuning, e.g., for fine-tuning Rotten Tomatoes, IMDB, AG News and MRPC, $\theta$ and $A_1, \ldots, A_d$ were pre-trained with the rest datasets. When the training data is limited, e.g., 10% and 5% training samples are used for fine-tuning. Recall that Factor-Tuning method needs to tune the factors $\theta$ as well as a small number of parameters in $A_1, \ldots, A_d$. The fraction of trainable parameters in $A_1, \ldots, A_d$ is set to 0.5% by default to make the total number of trainable parameters comparable to adapter.

FIG. 9 lists the number of trainable parameters for each method. As shown, the Factor-Tuning method still has much fewer trainable parameters than full fine-tuning (1.31%), and the trainable parameters can be further reduced by choosing smaller fractions in $A_1, \ldots, A_d$.

FIG. 8 shows the performance comparison on different datasets. It is observed that the Factor-Tuning approach achieves the best performance on Rotten Tomatoes, IMDB and SST2, CoLA (10% training samples), while Adapter obtains the best performance on AG News and MRPC, and LoRA achieves the second best performance on AG News and SST2 with 5% training samples. Considering the standard deviations, the Factor-Tuning approach achieves significantly better results than Adapter on Rotten Tomatoes, IMDB and SST2, and has a comparable performance on AG News and CoLA. The Factor-Tuning approach performs much better than the others on SST2 because SST2, Rotten Tomatoes and IMDB are all sentiment analysis tasks which may contain shared information or knowledge. When $\theta$ and $A_1, \ldots, A_d$ are learned from the datasets including Rotten Tomatoes and IMDB, the information encoded in the learned representation is useful for a related downstream task such as SST2. Adapter outperforms our method on MRPC because MRPC is not a text classification task as the others so that the learned $\theta$ and $A_1, \ldots, A_d$ may not help much in fine-tuning.

FIG. 10 shows the example performance when tuning only $\theta$ reduces the trainable parameters significantly, e.g., only 144 parameters (not including the classification head) are tuned and when the masks Mi are randomly selected instead of determined by $Mi=1[|Ai|>T]$ (Mi determines which parameters in Ai are trainable). When the masks Mi are randomly selected instead of determined by the values of Ai, the performance drops consistently, e.g., from 88.58 to 88.46 on Rotten tomatoes, from 94.10 to 93.23 on SST2, and from 47.23 to 41.80 on CoLA. This experiment confirms that the learned sparse components Ai contain useful information about which parameters should be updated during fine-tuning, i.e., the learned representation of parameter changes helps in fine-tuning on new tasks. Tuning $\theta$ only has the worse performance as expected because it only has 144 trainable parameters (if the classification head is not counted). Note that it still achieves better performance than Adapter, Prefix-tuning and LoRA on Rotten Tomatoes and IMDB. Therefore, if there are large enough datasets on diverse domains for learning the representation of parameter changes, it is possible that we obtain comparable fine-tuning results by only tuning $\theta$, which reduces the number of trainable parameters significantly.

Figure 11:
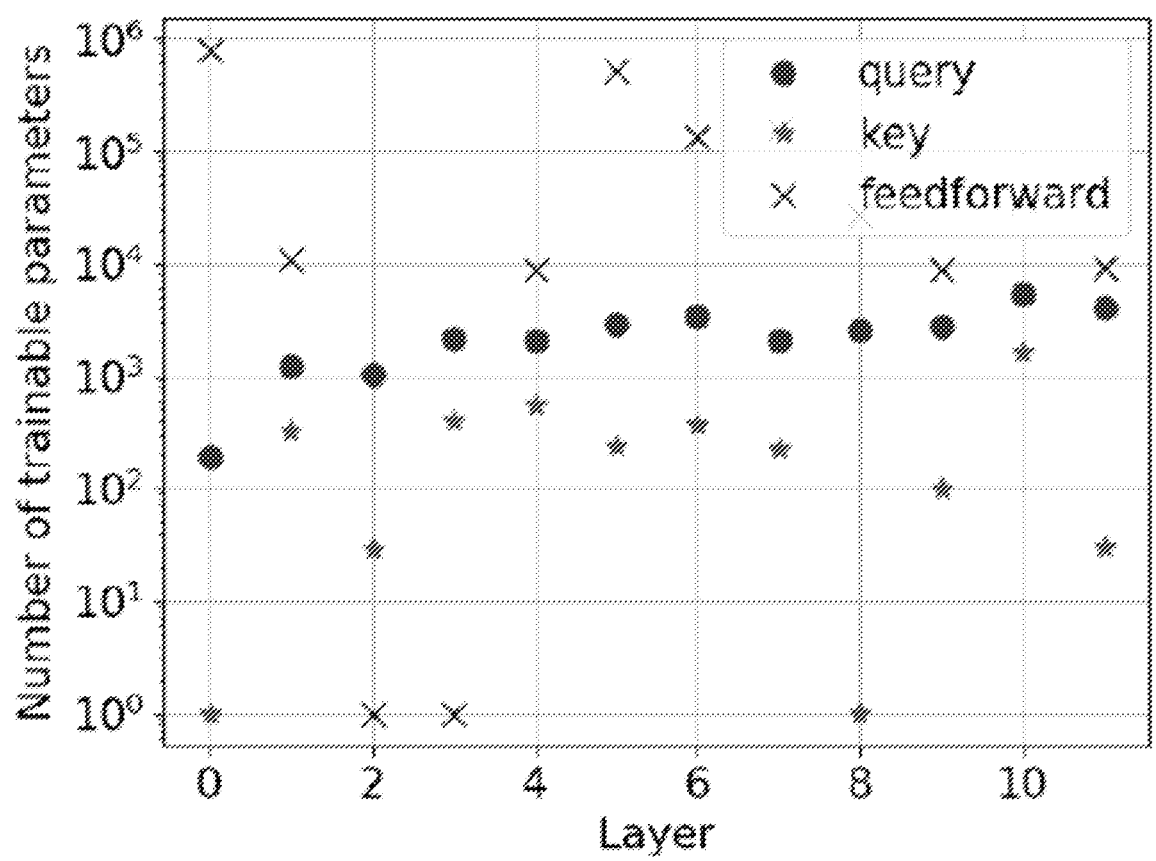

FIG. 11 shows the number of the trainable parameters for each query, key and feedforward layer in each transformer block. The case when 0.5% of the parameters in $A_1, \ldots, A_d$ are trainable (determined by $M_1, \ldots, M_d$). Clearly, the feedforward layers contain the most trainable parameters than the query and key layers. It means that a smaller number of parameters need to be modified in the multi-head attention modules and a relatively larger number of parameters in the feedforward layers.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of parameter-efficient training of a pre-trained language model having a plurality of parameters, the method comprising:
   receiving a first training dataset on a first domain and a second training dataset on a second domain for fine-tuning the pre-trained language model having at least a feedforward layer and a query-and-key layer;
   training the pre-trained language model based on the first training dataset, wherein the plurality of parameters contain a first set of parameter changes during the training;
   continuing training the pre-trained language model based on the second training dataset, wherein the plurality of parameters contain a second set of parameter changes during the continued training;
   determining, by a first factor module inserted at the query-and-key layer and a second factor module inserted at the feedforward layer of the pre-trained language model, from the training and the continued training based on the first training dataset and the second training dataset, a first domain-dependent factor associated with the first set of parameter changes and a second domain-dependent factor associated with the second set of parameters changes, respectively;
   receiving a third training dataset on a third domain for finetuning the pre-trained language model;
   determining, by a first tunable module inserted at the query-and-key layer and a second tunable module inserted at the feedforward layer of the pre-trained language model, a third set of parameters to be changed based at least in part on the first domain-dependent factor, and the second domain-dependent factor, and the third domain; and
   fine-tuning the pre-trained language model based on the third training third dataset, while only updating the third set of parameters but fixing remaining parameters of the plurality of parameters.

2. The method of claim 1, further comprising:
   determining, from the training based on the first training dataset and the second training dataset, one or more sparse components that are shared across the first domain and the second domain,
      wherein parameters of the pre-trained language model are updated as a weighted sum of the one or more sparse components weighted by the first domain-dependent factor or the second domain-dependent factor.

3. The method of claim 2, wherein the training the pre-trained language model includes:
   computing a classification loss based on training inputs from the first training dataset and the second training dataset;
   computing a regularization term based on the one or more sparse components;
   computing a training loss based on a weighted sum of the classification loss and the regularization term; and
   updating the weighted sum of the one or more sparse components based on the computed training loss via backpropagation.

4. The method of claim 3, wherein the updating the weighted sum of the one or more sparse components is performed by a first factor module inserted at a query and key layer and a second factor module inserted at a feedforward layer in the pretrained language model, wherein the first factor module or the second factor module updates a subset of the parameters that correspond to the weighted sum of the one or more sparse components.

5. The method of claim 3, further comprising:
   determining, from the updating, the first set of parameter changes corresponding to a first training input from the first training dataset;
   determining, from the updating, the second set of parameter changes corresponding to a second training input from the second training dataset; and
   determining the first domain-dependent factor, the second domain-dependent factor and the one or more sparse components based on the first set of parameter changes and the second set of parameter changes.

6. The method of claim 2, wherein the determining the third set of parameters to be changed further includes:
   computing a fine-tuning loss using training inputs from the third training dataset;
   updating the third set of parameters for the pretrained language model based on the fine-tuning loss,
      wherein the third set of parameters includes a tunable third domain-dependent factor and one or more tunable components, and
      wherein each tunable component includes a subset of tunable parameters from a corresponding sparse component from the determined one or more sparse components.

7. The method of claim 6, wherein the third set of parameters are computed based on the tunable third domain-dependent factor, and the one or more tunable components applied with a set of sparsity masks,
   wherein during the updating, the one or more sparse components and the set of sparsity masks are fixed.

8. The method of claim 7, wherein each of the set of sparsity masks is computed as an indicator function selecting values from a corresponding sparse component that are greater than a pre-defined threshold.

9. The method of claim 8, further comprising:
   receiving an adjustment to the pre-defined threshold; and
   controlling a total number of parameters in the third set of parameters by applying an adjusted threshold.

10. The method of claim 6, wherein the fine-tuning the pre-trained language model is performed by a first tunable module inserted at a query and key layer and a second tunable module inserted at a feedforward layer in the pre-trained language model,
    wherein the first tunable module or the second tunable module updates the third set of parameters by tuning the tunable third domain-dependent factor and the one or more tunable components.

11. A system for parameter-efficient training of a pre-trained language model having a plurality of parameters, the system comprising:
    a communication interface receiving a first training dataset on a first domain and a second training dataset on a second domain for finetuning the pre-trained language model having at least a feedforward layer and a query-and-key layer;
    a memory storing the pre-trained language model and a plurality of processor-executable instructions; and
    one or more processors executing the plurality of processor-executable instructions to perform operations including:

training the pre-trained language model based on the first training dataset, wherein the plurality of parameters contain a first set of parameter changes during the training;

continuing training the pre-trained language model based on the second training dataset, wherein the plurality of parameters contain a second set of parameter changes during the continued training;

determining, by a first factor module inserted at the query-and-key layer and a second factor module inserted at the feedforward layer of the pre-trained language model, from the training and the continued training based on the first training dataset and the second training dataset, a first domain-dependent factor associated with the first set of parameter changes and a second domain-dependent factor associated with the second set of parameters changes, respectively;

receiving a third training dataset on a third domain for finetuning the pre-trained language model;

determining, by a first tunable module inserted at the query-and-key layer and a second tunable module inserted at the feedforward layer of the pre-trained language model, a third set of parameters to be changed based at least in part on the first domain-dependent factor, and the second domain-dependent factor, and the third domain; and fine-tuning the pre-trained language model based on the third training third dataset, while only updating the third set of parameters but fixing remaining parameters of the plurality of parameters.

12. The system of claim 11, wherein the operations further include:

determining, from the training based on the first training dataset and the second training dataset, one or more sparse components that are shared across the first domain and the second domain, wherein parameters of the pre-trained language model are updated as a weighted sum of the one or more sparse components weighted by the first domain-dependent factor or the second domain-dependent factor.

13. The system of claim 12, wherein an operation of training the pre-trained language model includes:

computing a classification loss based on training inputs from the first training dataset and the second training dataset;

computing a regularization term based on the one or more sparse components;

computing a training loss based on a weighted sum of the classification loss and the regularization term; and updating the weighted sum of the one or more sparse components based on the computed training loss via backpropagation.

14. The system of claim 13, wherein an operation of updating the weighted sum of the one or more sparse components is performed by a first factor module inserted at a query and key layer and a second factor module inserted at a feedforward layer in the pretrained language model, wherein the first factor module or the second factor module updates a subset of the parameters that correspond to the weighted sum of the one or more sparse components.

15. The system of claim 13, wherein the operations further include:

determining, from the updating, the first set of parameter changes corresponding to a first training input from the first training dataset;

determining, from the updating, the second set of parameter changes corresponding to a second training input from the second training dataset; and determining the first domain-dependent factor, the second domain-dependent factor and the one or more sparse components based on the first set of parameter changes and the second set of parameter changes.

16. The system of claim 12, wherein an operation of determining the third set of parameters to be changed further includes:

computing a fine-tuning loss using training inputs from the third training dataset;

updating the third set of parameters for the pretrained language model based on the fine-tuning loss, wherein the third set of parameters includes a tunable third domain-dependent factor and one or more tunable components, and wherein each tunable component includes a subset of tunable parameters from a corresponding sparse component from the determined one or more sparse components.

17. The system of claim 16, wherein the third set of parameters are computed based on the tunable third domain-dependent factor, and the one or more tunable components applied with a set of sparsity masks, wherein during the updating, the one or more sparse components and the set of sparsity masks are fixed.

18. The system of claim 17, wherein each of the set of sparsity masks is computed as an indicator function selecting values from a corresponding sparse component that are greater than a pre-defined threshold.

19. The system of claim 16, wherein an operation of fine-tuning the pre-trained language model is performed by a first tunable module inserted at a query and key layer and a second tunable module inserted at a feedforward layer in the pretrained language model, wherein the first tunable module or the second tunable module updates the third set of parameters by tuning the tunable third domain-dependent factor and the one or more tunable components.

20. A non-transitory processor-readable storage medium storing a plurality of processor-executable instructions for parameter-efficient training of a pre-trained language model having a plurality of parameters, the instructions being executed by one or more processors to perform operations comprising:

receiving a first training dataset on a first domain and a second training dataset on a second domain for fine-tuning the pre-trained language model having at least a feedforward layer and a query-and-key layer;

training the pre-trained language model based on the first training dataset, wherein the plurality of parameters contain a first set of parameter changes during the training;

continuing training the pre-trained language model based on the second training dataset, wherein the plurality of parameters contain a second set of parameter changes during the continued training;

determining, by a first factor module inserted at the query-and-key layer and a second factor module inserted at the feedforward layer of the pre-trained language model, from the training and the continued training based on the first training dataset and the second training dataset, a first domain-dependent factor associated with the first set of parameter changes and a second domain-dependent factor associated with the second set of parameters changes, respectively;

receiving a third training dataset on a third domain for finetuning the pre-trained language model;

determining, by a first tunable module inserted at the query-and-key layer and a second tunable module inserted at the feedforward layer of the pre-trained language model, a third set of parameters to be changed based at least in part on the first domain-dependent factor, and the second domain-dependent factor, and the third domain; and fine-tuning the pre-trained language model based on the third training third dataset, while only updating the third set of parameters but fixing remaining parameters of the plurality of parameters.

\* \* \* \* \*